US007697891B2

(12) United States Patent
Desrosiers et al.

(10) Patent No.: US 7,697,891 B2

(45) Date of Patent: Apr. 13, 2010

(54) BABY MONITOR SYSTEM

(75) Inventors: Craig S. Desrosiers, Spring City, PA (US); Ronald G. Pace, Naperville, IL (US)

(73) Assignee: Graco Children's Products Inc., Atlanta, GA (US)

( * ) Notice: Subject to any disclaimer, the term of this patent is extended or adjusted under 35 U.S.C. 154(b) by 601 days.

(21) Appl. No.: 11/392,206

(22) Filed: Mar. 28, 2006

(65) Prior Publication Data

US 2006/0232428 A1 Oct. 19, 2006

Related U.S. Application Data

(60) Provisional application No. 60/665,384, filed on Mar. 28, 2005.

(51) Int. Cl.
*H04B 7/24* (2006.01)

(52) U.S. Cl. ................... 455/39; 455/41.2; 340/539.15; 340/573.1

(58) Field of Classification Search .............. 340/573.1, 340/539.15, 573.4; 455/434, 39, 41.2
See application file for complete search history.

(56) References Cited

U.S. PATENT DOCUMENTS 5,933,779 A * 8/1999 Sandre et al. ............... 455/513
6,043,747 A * 3/2000 Altenhofen .............. 340/573.1
6,462,664 B1 10/2002 Cuijpers et al.
6,467,059 B1 10/2002 Ohashi
6,580,700 B1 * 6/2003 Pinard et al. ................ 370/332
6,759,961 B2 * 7/2004 Fitzgerald et al. ........ 340/573.1
6,847,302 B2 1/2005 Flanagan et al.
2002/0098819 A1 * 7/2002 Phang et al. ................ 455/260
2003/0122676 A1 7/2003 Cuijpers et al.
2004/0001530 A1 * 1/2004 Lyle et al. ................... 375/132
2004/0246136 A1 12/2004 Sanoner et al.

OTHER PUBLICATIONS

Instruction Manual for Philips Baby Monitor Product No. SBC SC477 DECT; 15 pages, Mar. 2000.
Safety 1$^{st}$ 900 MHz Home Connection Monitor; www.amazon.com; Baby Products; 3 pages, Feb. 1998.
KEC Semiconductor Technical Data for KIA6966S Bipolar Linear Integrated Circuit; 1994; 3 pages, Mar. 1994.

* cited by examiner

*Primary Examiner*—Raymond S Dean
(74) *Attorney, Agent, or Firm*—Lempia Braidwood LLC

(57) ABSTRACT

A baby monitor system has a child unit with a child transducer that receives and converts incoming audio signals to an incoming analog signal. The child unit has an analog-to-digital converter that converts the incoming analog signal to outgoing digital data. A child unit microprocessor converts the outgoing digital data to a wireless signal and a transmitter of the child unit transmits the wireless signal. A parent unit has a receiver that receives the wireless signal and converts the wireless signal to incoming digital data. A parent unit microprocessor processes the incoming digital data. A digital-to-analog converter in the parent unit converts the processed incoming digital data to outgoing analog information. A parent unit transducer converts the outgoing analog information and transmits outgoing audio signals representative of the incoming audio signals.

20 Claims, 10 Drawing Sheets

BABY MONITOR SYSTEM

RELATED APPLICATION DATA

This patent claims priority benefit of U.S. Provisional Patent Application Ser. No. 60/665,384, which was filed on Mar. 28, 2005, which was tilted "Baby Monitor," and the entire contents of which are incorporated herein by reference.

BACKGROUND OF THE INVENTION

1. Field of the Disclosure

The present disclosure is generally directed to monitor systems, and more particularly to baby monitor systems.

2. Description of Related Art

Baby monitor systems are well known in the art. Systems that utilize wireless transmission technology are also known in the art. The various known baby monitor systems incorporate many different features and functions. In one example, a baby monitor system offered by SAFETY 1$^{st}$ is known as the "900 MHz HOME CONNECTION MONITOR." The SAFETY 1$^{st}$ system has three child units and a parent unit. In one operation mode, the SAFETY 1$^{st}$ parent unit has the ability to automatically connect with and scan between each one of the child units every few seconds. In another mode, the unit can also be set to monitor only a selected one of the child units. The parent unit includes an indication light for each of the three baby units. The light for a unit being monitored at any particular time is illuminated. The SAFETY 1$^{st}$ system can only monitor one child unit at a time, so there is no difficulty determining which child unit is picking up audible sounds heard at the parent unit. However, the parent unit can not monitor more than one child unit simultaneously and can not differentiate or distinguish among the child units to monitor a particular child unit if that unit is transmitting greater sound levels than the others.

Some other existing baby monitor systems include child and parent units with relatively simple potentiometer-type on/off power controls. This type of control uses an intricate mechanical power switch or a non-momentary switch to control power at the units. These types of switches are relatively costly, take up significant space both on and inside the units, and do not offer a more modern, high-tech, "momentary" or soft-touch feel to which consumers have become quite accustomed. Instead, baby monitor systems are still provided with perceived antiquated mechanical on/off push buttons and potentiometer-type switches.

Conventional baby monitor systems also use a progressive light bar or a series of "sound lights" in the form of a light emitting diode (LED) display. The typical parent unit in these types of systems requires or uses a dedicated integrated circuit to control the LED display. The dedicated circuit adds cost, takes up circuit board space within the unit, and is not capable of performing functions other than handling and controlling the LED display. With this type of system, the LED display is limited to only conveying the amplitude of the sound picked up by the child unit. These types of baby monitor systems use conventional integrated circuits, such as the KEC KIA 6966S, 5-Dot LED VU METER, to control the lights. This circuit is typically connected to an analog audio output of the parent unit and drives the LED display to provide a logarithmic volume level display. Thus, most baby monitor systems today have sound lights that behave in a very similar fashion and that can not provide or support any other function.

There are known wireless baby monitor systems that utilize technology other than frequency modulated (FM) signals. However, these systems are typically very expensive and complicated and use technology suited for other uses. For example, a system offered by Philips is known as the "SBC SC477 DECT Baby Monitor." This system employs cordless phone technology built to the European cellular DECT standard. This technology is relatively complicated and expensive and is needlessly complex for most standard baby monitor systems.

Examples of other systems with particular features are disclosed in a number of U.S. patents and published applications. For example, U.S. Publication No. 2004/0246136 generally describes a baby monitor system wherein the transmitted signal includes both the converted sounds picked up by the child unit and a privacy code. The code is transmitted as part of the signal to and used by the parent unit to determine if a valid transmission is being received.

U.S. Pat. No. 6,462,664 describes a parent unit that can control other devices like a television to reduce the sound level in the area of the parent unit when the parent unit is generating loud sounds so that the parent can hear these sounds. The expensive and complicated cellular DECT technology of the Philips system makes this feature possible.

U.S. Pat. No. 6,759,961 describes a two-way communication baby monitor system that employs what is termed a "soothing unit" within the child unit that can be controlled by the parent unit. U.S. Pat. No. 6,467,059 describes a wireless transmission system that employs wireless digital two-way communication. An identification code is transmitted directly with the information or date so that the receiving unit can identify and indicate to which system a transmission belongs. Similar to the publication noted above, the identification code described in the U.S. Pat. No. 6,467,059 patent is transmitted directly with the digital information from the child unit to the parent unit. U.S. Pat. No. 6,847,302 describes a wireless transmitter and receiver that employ a privacy code assigned to each unit pair.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A wireless baby monitor system is disclosed and described herein that solves or improves upon one or more of the problems with prior art baby monitor systems. The disclosed baby monitor systems can employ any one or more of a number of unique features. These features are disclosed herein and can be employed in a relatively simple platform configuration for the parent and child units. This relatively simple platform configuration can be modified or upgraded to incorporate any one or more optional features disclosed herein. Some of the features disclosed herein can also be used in conventional baby monitor systems as well.

One feature disclosed herein is a system that employs a parent unit and multiple child units wherein the parent unit can simultaneously monitor the child units and convey real-time information to the parent relevant either to only one of the child units emitting a higher amplitude sound, or to both of the child units. Another feature disclosed herein is the use of high-tech, momentary on/off switch technology in the parent or child units. Another feature disclosed herein is direct microprocessor control of the LED display in the parent unit, which eliminates the dedicated integrated circuit and permits direct control of the LED display. Yet another feature disclosed herein is to store a unique identification code in the child unit. The code can be matched in the parent unit before the parent unit will convert data to sound or light information at the parent unit without the code having been transmitted to the parent unit. Yet another feature disclosed herein is to employ automatic channel selection in the parent unit of a monitor system. Still other features disclosed herein include a method of continuously determining a good connection between the units, generation of high quality alert sounds to convey operational conditions of the system, and two-way transmission of commands or data other than audio information between the units.

Figure 1:
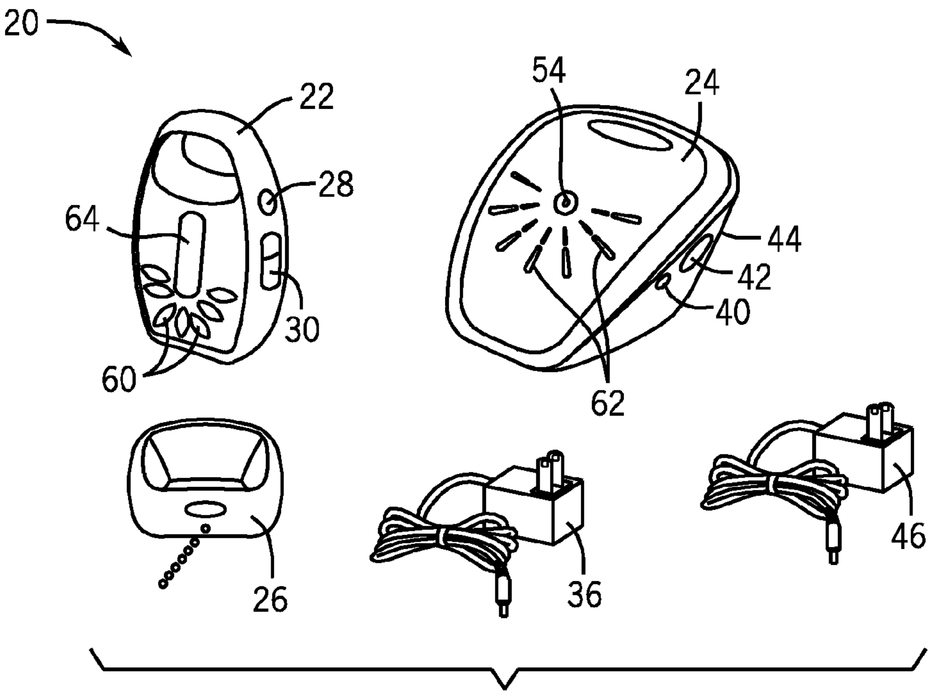
FIG. 1 is a perspective view of one example of a baby monitor system that can be constructed in accordance with the teachings of the present invention.

Turning now to the drawings, FIG. 1 illustrates one example of a baby monitor system 20 constructed in accordance with the teachings of the present invention. In this example, the system includes at least one parent unit 22 and at least one child or nursery unit 24. As will be evident to those having ordinary skill in the art, more than one parent unit or child unit can also be provided as part of the system, as discussed in greater detail below. There may be instances where one aspect or feature disclosed herein incorporates multiple parent or child units.

Figure 2A:
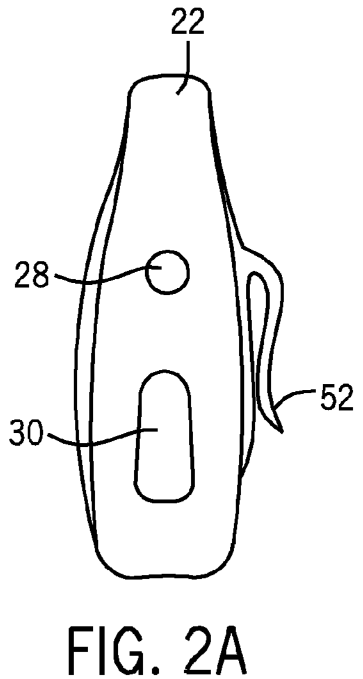
FIGS. 2A and 2B are left and right side views of the parent unit of the system shown in FIG. 1.
Figure 2B:
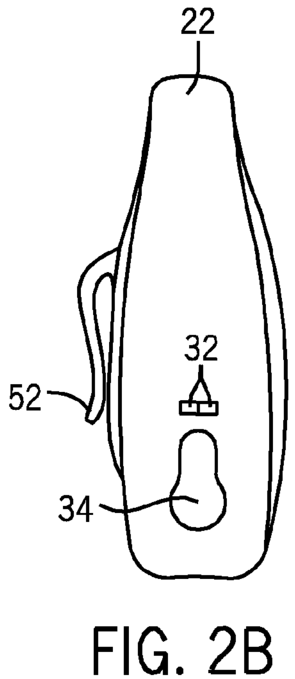

As is known in the art, a parent unit can include a docking station 26 that plugs into an AC wall jack. The docking station 26 can be configured to receive and recharge the parent unit 22. FIGS. 2A and 2B show the opposite sides of the parent unit of FIG. 1. In this example, the parent unit 22 includes an on/off or power button 28 and a toggle-type volume up and volume down switch 30. The opposite side of the parent unit 22 in this example includes a light 32 as a battery indicator and a DC adapter jack 34 with a rubber cover covering the opening. A DC adapter 36 can be used to power the parent unit via an ordinary AC source The battery indicator 32 can illuminate in more than one color and, in one example, can illuminate green when recharging or when being used remotely with a good battery charge. The light can illuminate red when the batteries are low. Clearly, many other examples can employ different configurations and constructions relative to the docking station, the battery, the parent unit shell, and the arrangement of the buttons and switches on the parent unit.

Figure 3:
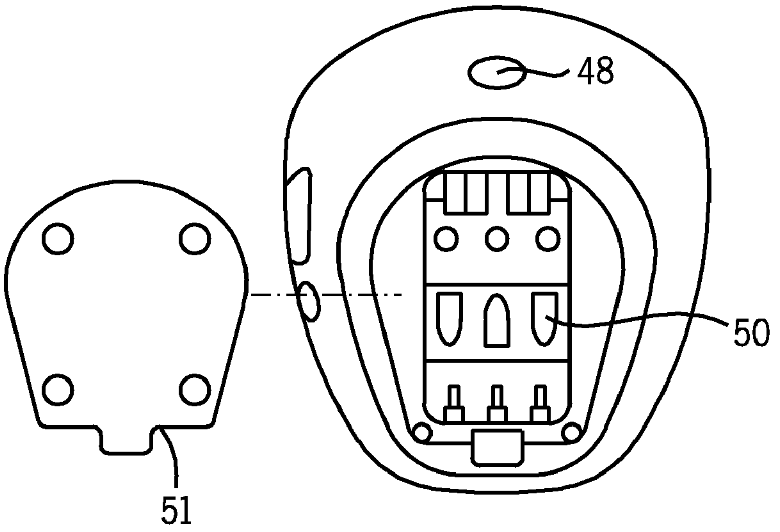
FIG. 3 is a bottom view of the child unit of the system shown in FIG. 1.

The child unit 24 in this example has an on/off button 40 on one side of the unit and also includes a channel selector switch 42 on that same side of the unit. In one example, the child unit 24 can also incorporate a parent finder button 44, which can be depressed to emit a sound on the parent unit 22, if turned on, so that the parent unit can be easily located. In this example, the child unit 24 also comes with a conventional AC adapter 46 and a DC adapter jack 48 on the back of the unit as shown in FIG. 3. Thus, each of the units 22 and 24 can operate either by on-board, rechargeable or replaceable batteries, or by externally supplied AC power using an AC wall jack and a DC adapter.

The above-described features of both the parent and child units are similar to features found in other baby monitor systems. Additionally, the parent unit 22 can be provided with a belt clip 52 as shown in FIGS. 2A and 2B as is also known in the art. That way the parent unit 22 can be carried by a parent as needed. As shown in FIG. 1, the nursery unit 24 on its front face includes a power LED 54 that in this example can also operate in either red or green modes. A green LED mode can indicate that the power to the unit is on and, if running on batteries, the batteries are fine. A red LED mode can indicate that the batteries are low when the unit is on.

The parent unit 22 has a plurality of passages or openings 60 on the front surface that open to a speaker in the unit. The child unit 24 similarly has openings 62in the front surface that are open to a microphone so the unit can pick up sounds. The parent unit 22 includes an array of sequential LED lights in the form of a light bar or series of lights 64. One of the lights in the light bar 64 of the parent unit 22 can be a connection light that indicates a good connection between the parent and child units when in use.

By using the above reference numbers, the above-described system 20 including a parent unit 22 and child unit 24 with the various buttons, lights, and connectors are generally incorporated into each of the more detailed descriptions below for various features disclosed herein. As will evident to those having ordinary skill in the art, the configuration, arrangement, positioning, availability, and the like of the parent and child unit shells, lights, buttons, and switches can vary considerably and yet fall within the spirit and scope of the present invention. FIGS. 1-3 are provided herein merely for the purpose of generally depicting a baby monitor system and for the later description of features that may pertain to one or more of these more generic aspects of the units.

Figure 4:
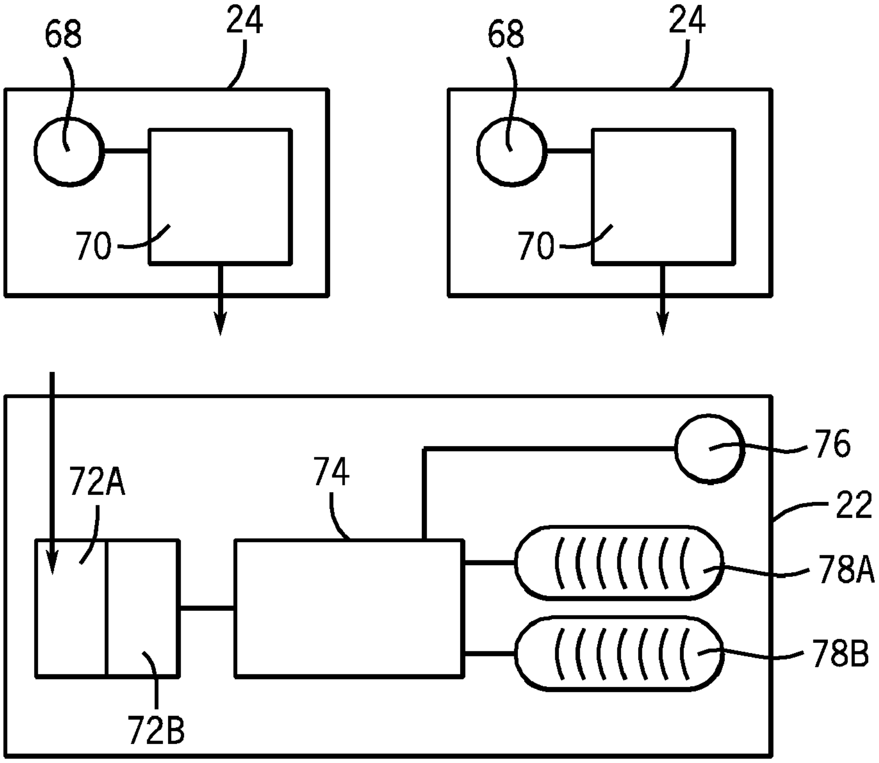
FIG. 4 is a schematic representation of one example of a baby monitor system constructed in accordance with the teachings of the present invention and having-multiple child units monitored by a parent unit.

FIG. 4 illustrates one example of a baby monitor system 20 constructed in accordance with the teachings of the present invention. In this example, the system 20 includes at least two child units 24 and at least one parent unit 22. In this example, the child units 24 each have a microphone 68 and a transmitter 70. Each unit picks up sound through its own microphone 68 and transmits appropriate signals representative of the sound to the parent unit 22. In this example, the parent unit 22 includes two or more distinct receivers 72A and 72B, each dedicated to a particular child unit so that the parent unit can simultaneously receive signals from both child unit transmitters 70. The parent unit also includes a sound processor 74 that differentiates the sound information transmitted by the two child units 24. The sound processor module can then receive those signals from each receiver, combine the signals into one audio signal and deliver those to a speaker 76. The sound processor can then keep the audio information from each receiver segregated and deliver the information separately to a dedicated meter or light bar 78A or 78B.

In this example, the processor 74 in the parent unit 22 delivers the sound information independently and simultaneously to the speaker 76. The speaker audibly emits the sound information simultaneously from both child units 24 in this example. The processor 74 also simultaneously transmits segregated signals representative of the sound information received from the two child unit transmitters 70, each to its own independent sound level meter 78A and 78B in the parent unit. In one example, each of the sound level meters can be an independent light bar or LED display as is known in the art, and as represented in FIG. 1 by the single light bar 60. Each sound level meter 78A and 78B can independently indicate the volume or amplitude of the sound information received from its particular child unit 24.

Thus, in this example a parent can listen to any audible sound information from the speaker 76. The parent can then also view the two sound level meters 78A and 78B to determine which, if any, of the child units 24 is picking up and transmitting sound information. As a result, a parent can simultaneously receive information from and monitor both child units at the same time. In another alternative example, it is possible to have multiple parent units, each with the same function as the single parent unit described in these examples. In a further example, the parent units can also include more than the two sound level meters as shown, depending upon the number of independent child units to be monitored.

In another example, a parent unit 22 could be provided with only a single receiver, and yet still listen to two child units. This can be accomplished by having the child units alternate their transmissions. The child units can not transmit at the same time. One will transmit for a short time and then stop. Then the other will transmit for a short time and then stop. This is known as Time Division Multiplexing. In order to accomplish this, each child unit must also have a receiver and listen to see if another child unit is receiving. The parent units must also include a transmitter. Once the parent unit receives a transmission from a child unit, it can send a command for the other child unit to transmit.

Figure 5:
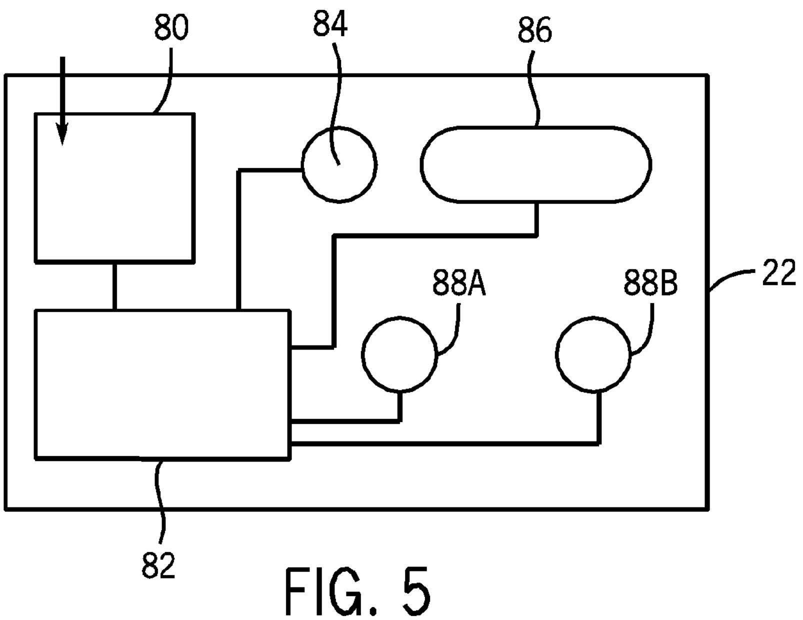
FIG. 5 is schematic representation of an alternative example of a parent unit for the system shown in FIG. 4.

FIG. 5 shows another alternative example of this type of baby monitor system. In this example, the parent unit 22 again monitors more than one child unit simultaneously. However, the parent unit in this example displays the information to a user differently than in the prior illustrated example. This example is again shown using only two child units 24 and a single parent unit 22. The parent unit 22 in this example includes a receiver 80, a sound processor 82, and a speaker 84, similar to the previous example. In this example, the sound processor 82 combines the signals from the two child units 24 from the receiver 80 into one real-time output that represents only the output from the child unit that currently transmits the higher sound amplitude to the speaker 84. In this example, the parent unit also includes only a single sound level meter 86. The sound processor delivers the combined real-time output that again corresponds to which ever child unit is presently transmitting the higher amplitude sound information.

The parent unit 22 in this example includes two lights or LED's 88A, 88B, one for each of the child units 24. A threshold reference can be set in the sound processor so that when a first child unit transmits information above the threshold reference, the light 88A for the first child unit illuminates. Similarly, when the sound level or amplitude from the second child unit surpasses the threshold reference, the light 88B is illuminated. In this example, each of the lights 88A and 88B can be a single individual light that either increases in brightness or blinks more rapidly as the amplitude increases, or can be an array of lights with more being lit as the amplitude increases.

Another feature of the present invention is to incorporate what is known as a momentary or soft-touch push button on/off power control in both the parent unit 22 and the child unit 24. The on/off button 28 of the parent unit and the on/off button 40 of the child unit can each be such a momentary or soft-touch button. These types of buttons are known for use with respect to a number of electronic devices available on the market. However, such devices are not used in a baby monitor system. The momentary button configuration provides a user interface with a more advanced appearance and feel and can be incorporated in a system that has more advanced electronics. Also, consumers will recognize and reach a certain comfort level when using the momentary buttons of the system because such buttons are found on many other electronic devices.

Figure 6:
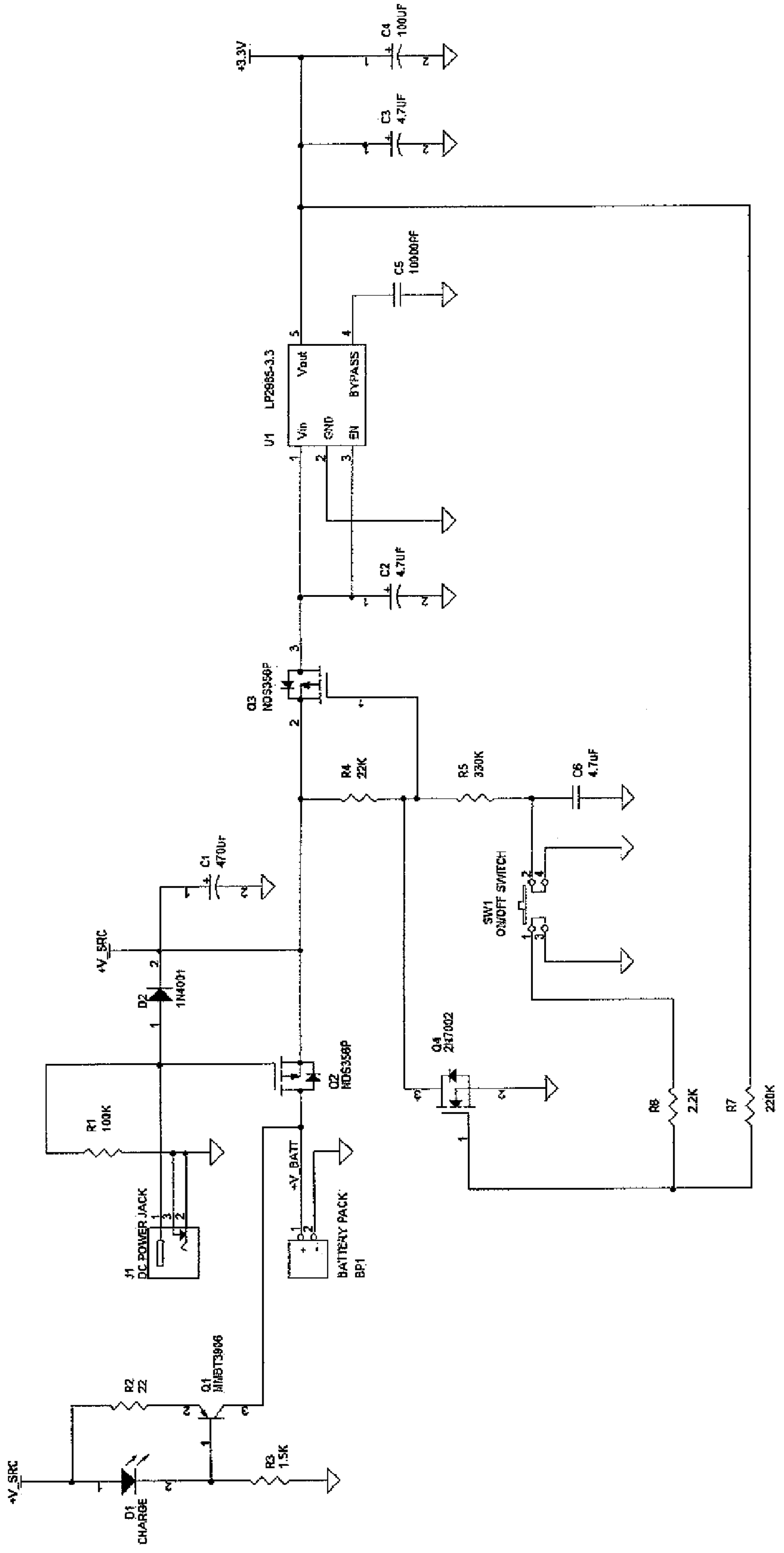
FIG. 6 is a circuit diagram of one example of a momentary on/off switch circuit for a baby monitor system and constructed in accordance with the teachings of the present invention.

FIG. 6 illustrates one example of a schematic for a momentary-type, on/off switch arrangement in a baby monitor system 20. The schematic shown in FIG. 6 results in a baby monitor with a number of additional advantages described in greater detail with reference to the drawing. These advantages go beyond the mere improved or perceived high-tech feel achieved by adding a momentary or soft-touch button.

The characters U1, C1, C2, C5, C3, and C4 of FIG. 6 in combination define a voltage regulator and filtering circuit that reduces either a high voltage from the battery pack BP1 or the jack J1 to a lower fixed or regulated voltage for use by the remaining unit components. The characters SW1, Q3, Q4, R4, R5, R6, R7, and C6 combine to form a momentary on/off switching circuit. Using the diagram, with a unit in the OFF state, the gate-to-source voltage of the transistor Q3 is 0 volts, which shuts off the transistor Q3. When an operator presses the switch SW1, voltage at the capacitor C6 is conducted through the switch and turns on the transistor Q4. This then sequentially turns on the transistor Q3. This allows voltage to be applied to the input of the voltage regulator U1. The output of U1 then moves or latches the transistor Q4 in the ON state. The ON state will remain until someone actuates the switch SW1 again.

Once the switch SW1 is depressed again, the voltage across the capacitor C6 drains to 0 volts and is conducted through the switch, which turns off the transistor Q4. This sequentially turns off the transistor Q3, which in turn shuts off power to the regulator integrated circuit U1. Once the switch SW1 is depressed turning off the system, the system will remain in the OFF state until a user again depresses the switch SW1. The location of the transistor Q3 in this example prevents current from either the DC power jack or the battery pack BP1 from flowing into the regulator integrated circuit U1. In this way, the current from the battery is extremely low when the system is turned off, which helps to insure and maintain a long batter life.

In the same diagram, the resistors R1, R2, and transistor Q2 combine to form a circuit that automatically connects the Q3 and Q2 transistors to either the battery pack BP1 or the wall supply power source. When the wall supply is connected to the jack J1, the gate-to-source voltage of the Q2 transistor is positive. In this state, the transistor Q2 is turned off and no current will flow from the battery pack BP1 to the rest of the circuit. This isolates the battery from the remaining parts of the circuit. When the voltage from the wall supply at the jack J1 is low or disconnected, the gate-to-source voltage at Q2 is negative, which turns on Q2. Thus, current can then flow from the battery BP1 to the rest of the circuit with minimal voltage loss across the transistor Q2. The diode D2 in the circuit prevents current from flowing from the battery pack into the DC power jack.

The switch circuit shown in FIG. 6 can be employed in a baby monitor system within both the parent unit 22 and the child unit 24 along with a small, inexpensive momentary on/off button component. Use of this type of circuit can result in zero or nearly zero power dissipation when the power to the units is turned off. This conserves battery life by not draining batteries through the circuit. This system does not require the use of a microprocessor to perform either the on/off function or the battery preservation function. The disclosed circuit can also result in an automatic and seamless switch-over from an external AC power source to the DC battery power source if the AC power source is lost. The system can also recharge the battery pack BP1 and provide power to the product when the unit is powered on and being supplied with power from the AC power source.

In an alternative example, the momentary on/off switch or button can be connected to a general purpose input pin on a microprocessor within a unit. The microprocessor can then be utilized to control the power on/off function using a separate output pin. However, in using this alternative arrangement, the microprocessor typically must be powered on at all times and thus may result in unwanted current consumption even when the units are powered off.

Another advantage of the circuit disclosed in FIG. 6 and described above is that the battery charging current will be essentially the same regardless of whether the unit is in the ON or OFF state. Existing baby monitor systems typically each charge their batteries at a much lower rate when the unit is powered on.

Figure 7:
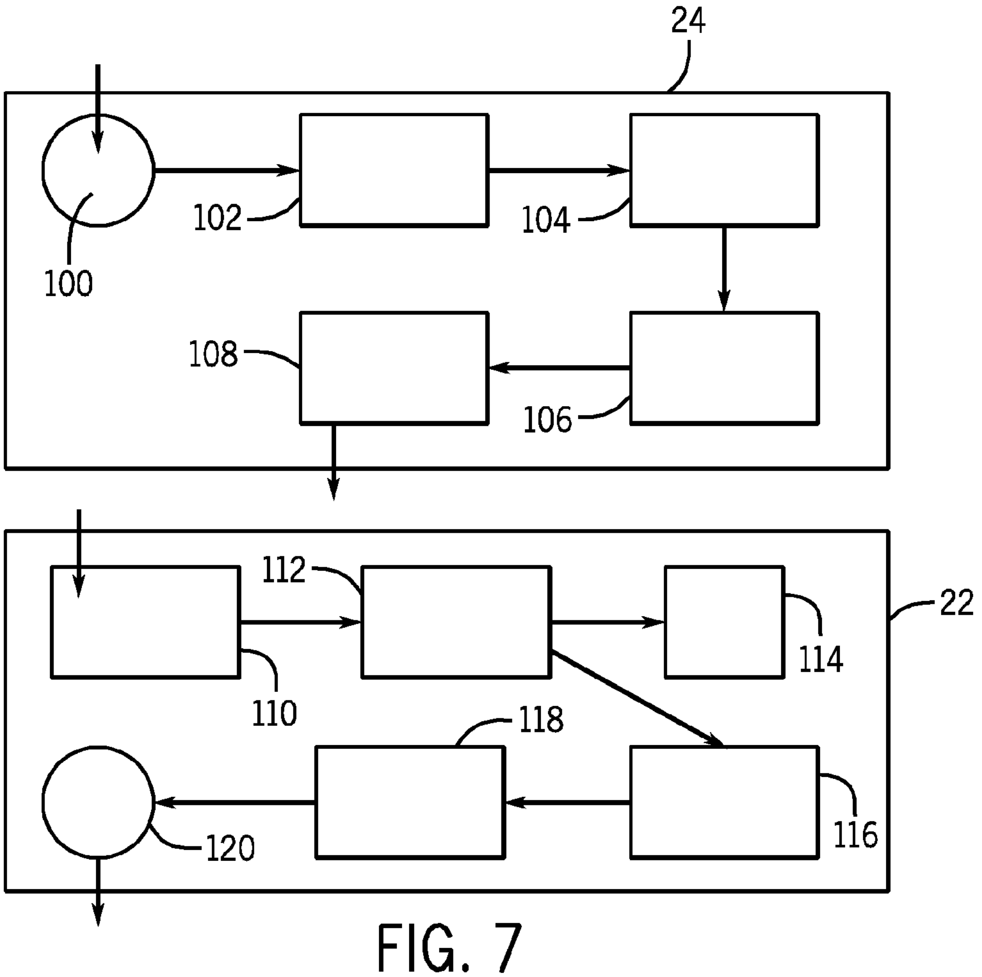
FIG. 7 is a schematic representation of one example of a baby monitor system constructed in accordance with the teachings of the present invention and employing direct microprocessor control of the sound lights display.

In another aspect of the present invention, a baby monitor system 20 can be configured as shown in the schematic of FIG. 7. This example can eliminate the need for a separate integrated circuit previously used solely to control or manage the sound lights or LED display. In this example, a child unit 24 employs a microphone 100 as a transducer and an amplifier 102 that amplifies the signal of the transducer. The child unit 24 also has an analog-to-digital converter (ADC) 104 that converts the analog signal from the microphone amplifier to a digital audio signal. The child unit 24 also has a microprocessor 106 that receives and processes the digital audio signal and transmits a digital data stream. The digital data is then sent by the microprocessor to a radio frequency (RF) transmitter 108 in the child unit. A parent unit 22 in this example includes an RF receiver that receives the RF transmission of the digital data stream from the child unit. The RF receiver 110 provides the information stream to a microprocessor 112 that processes the digital data. In this example, the microprocessor 112 can determine the amplitude of the audio signal from the child unit 24 and is capable of controlling the LEDs 114 of the light bar sound level meter on the parent unit 22. The microprocessor 112 directly controls the LED display 114 without the need for a separate integrated circuit. The microprocessor can also control sound information sent to the speaker of the unit.

The microprocessor in this example also sends the digital audio data to a digital-to-analog converter (DAC) 116 that converts the data to an analog signal. The analog audio signal is sent from the DAC 116 to a speaker amplifier 118 in this example, which then sends the amplified audio signal to a speaker 120 of the parent unit.

With this parent unit arrangement, the LED display 114 can be controlled for purposes other than illuminating according to the amplitude of the audio signal from the child unit. Since the microprocessor 112 in the parent unit directly controls the LED display 114, it is an option to have the LED display convey other information. In one example, the LED display can be used to convey the current volume setting as a user manipulates the volume up/down button 30 on the parent unit 22. As the volume is turned up by a user, the LED display can illuminate more lights and vise versa. In another example, the microprocessor 112 in the parent unit can be configured to generate a sound data that is converted into an analog audio signal by the DAC 116. The sound signal can then be sent to the speaker amplifier 118 and speaker 120. The amplitude of this sound can be changed by the microprocessor according to the volume setting to further reinforce the current volume setting to the user. The microprocessor 112 in the parent unit can also be utilized to convey other sounds through the speaker in the same manner. For example, when the unit is turned on and off, an alert sound can be generated. Alternatively, when an audio signal from the child unit reaches a certain threshold, a sound can be generated to alert anyone near, but not looking at, the parent unit 22. In yet another example, the LED display can be manipulated by the processor to illuminate in a pattern that represents the parent unit 22 searching for a signal from the child unit 24. There are certainly other forms of information that could be conveyed from the microprocessor 112 via the LED display 114 and the speaker 120 in this example. The arrangement shown in FIG. 7 permits these functions.

In another example, the child unit microprocessor 106 may determine the amplitude of the audio signal and then convey that information to the parent unit 22 with an indication of the audio amplitude. The parent unit 22 in such an example can receive the information and then make a determination as to how to represent this information on the LED display 114. In yet another example, the child unit microprocessor 106 can be utilized to determine the amplitude of the audio signal and make the further determination as to the particular light pattern to be displayed by the LED display 114. This information can then be digitally conveyed to the parent unit 22, which would receive the information and merely turn on the predetermined display pattern.

The concept shown in FIG. 7 provides at least two benefits in broad form. First, the monitor arrangement eliminates one integrated circuit from the system, reducing cost and space requirements on the circuit board within the unit. Second, the concept also permits creative control and flexibility in how the LED display 114 illumination patterns, as well as the speaker 120, can be operated and controlled and for what purpose.

Figure 8:
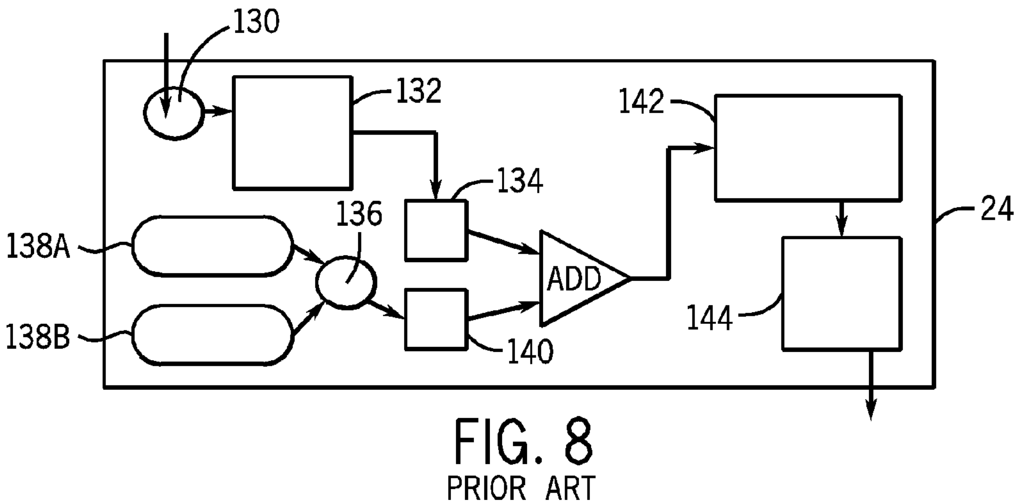
FIG. 8 PRIOR ART
FIG. 8 is a schematic representation of a prior art child unit with manual channel selection.

In yet another aspect of the present invention, an inexpensive and less complex RF modulator circuit is disclosed that yields a number of benefits for use in baby monitor systems. Conventional baby monitors use a simple switch and potentiometer arrangement that sets the DC voltage at the control input of a voltage controlled oscillator (VCO). This type of arrangement in a baby monitor system is relatively low cost but requires a user to manually move a switch to determine the channel or transmit frequency for the unit. FIG. 8 is a schematic showing a prior art child unit 24 with this type of known circuit arrangement which requires manual switching between transmission frequencies or channels. In general, the prior art unit has a microphone 130 and an amplifier 132 that deliver an amplified analog audio signal to a high pass filter 134. The unit also includes a user-actuated switch 136 that selects between first and second DC voltages 138A or 138B. The selected DC voltage is then added through a low pass filter 140 to the high pass filtered amplified analog signal. The combined voltages are then sent to a RF VCO, which then further sends the data stream to a RF transmitter.

Figure 9:
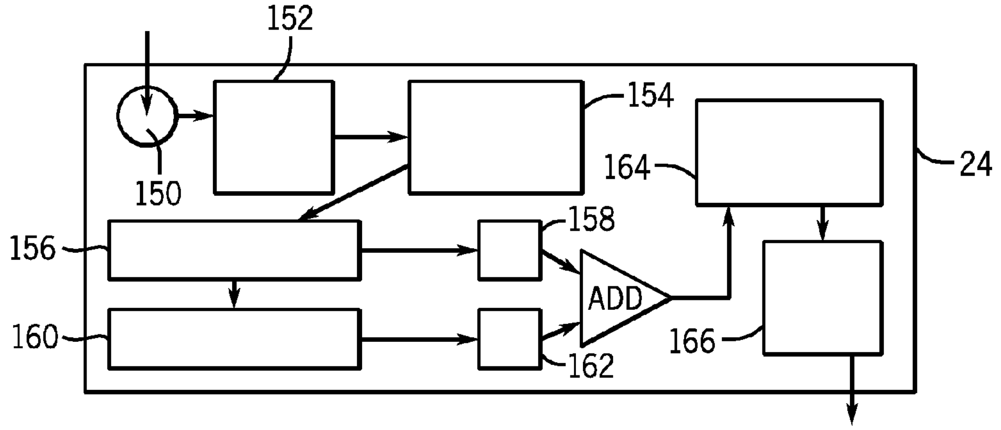
FIG. 9 is a schematic representation of a child unit constructed in accordance with the teachings of the present invention and having automatic frequency control capability.

In this aspect of the present invention, the user selection method is eliminated. FIG. 9 illustrates a schematic for a child unit 24 embodying one example of this concept. The unit 24 in this example also includes a microphone 150 and a microphone amplifier 152 to produce an amplified analog audio signal detected at the child unit. The amplified analog audio signal is then converted to a digital audio signal with an ADC 154 that is also provided in the child unit 24. The digital audio signal is then transmitted to a microprocessor 156 in the child unit. The microprocessor 156 arranges the digital audio information into a digital data stream suitable for transmission.

The microprocessor also sends digital information to two different components. First, the digital data stream is sent to a high pass filter 158 that removes the DC component from the data stream. Simultaneously, the microprocessor sends digital data to a digital-to-analog converter (DAC) 160. The DAC 160 generates an analog voltage that is used to determine and control the transmit frequency of the information. The microprocessor can send different data to the DAC 160 to change the transmit frequency. The analog voltage is delivered to a low pass filter 162 that insures that the analog voltage is a stable DC voltage. The filtered analog voltage and the filtered digital data are added together and then delivered to a RF VCO 164. The VCO is configured to generate a high frequency signal that is controlled by the input signal. The DC component of the input signal determines the base transmit frequency of the information transmitted from the child unit. The digital data stream modulates the base frequency to create a RF frequency shift keyed signal. The modulated RF data stream is transmitted by a RF transmitter 166 to then be received by a parent unit 22. In one example, a user can push a button 42 on the child unit 24 to cause the microprocessor to select the next channel or transmit frequency, from a plurality of different frequencies, such as six different channels.

Figure 10:
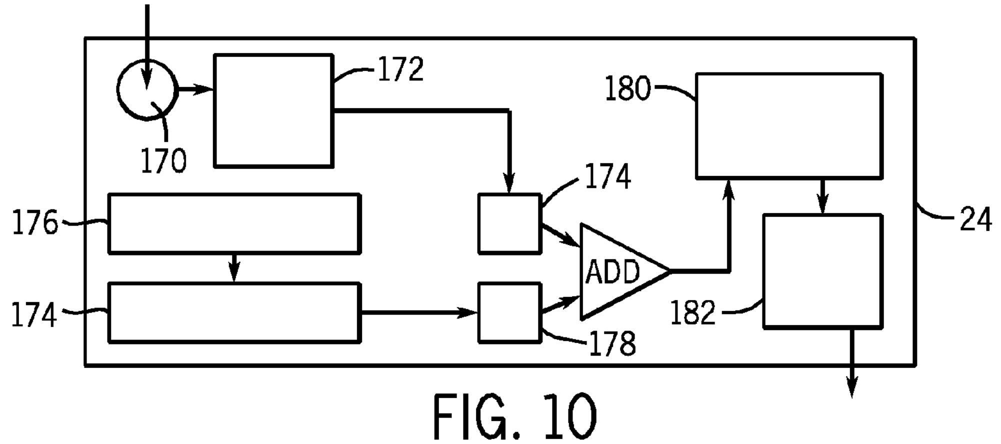
FIG. 10 is a schematic representation of another example of a child unit having automatic frequency control capability.

In an alternative example, the child unit may send analog data instead of digital data to the voltage controlled oscillator or VCO. FIG. 10 shows such a system. In this example, the child unit 24 includes a microphone 170 for picking up sound adjacent the child unit and transmitting the sound to an amplifier 172. The amplified analog audio signal is sent to a high pass filter 174. A microprocessor 176 is provided in the child unit and generates information sent to an analog-to-digital converter or ADC 177 that then generates a DC voltage transmitted to a low pass filter 178. The analog data from the amplifier 172 and the digital data from the ADC 177 are added and sent to a RF VCO 180, which then sends the information to a RF transmitter 182.

In yet another alternative example, the high pass filter can be deleted altogether. This allows either digital or analog signals with a DC voltage component to be modulated by the voltage controlled oscillator or VCO. This can allow the system to transmit signals with a frequency response that includes DC. A typical RF modulation circuit does not allow frequency response down to low voltage or DC levels. All of the above-examples provide inexpensive and simple solutions that allow a microprocessor to control the transmit frequency directly. This feature is not currently available on existing baby monitors.

Figure 11:
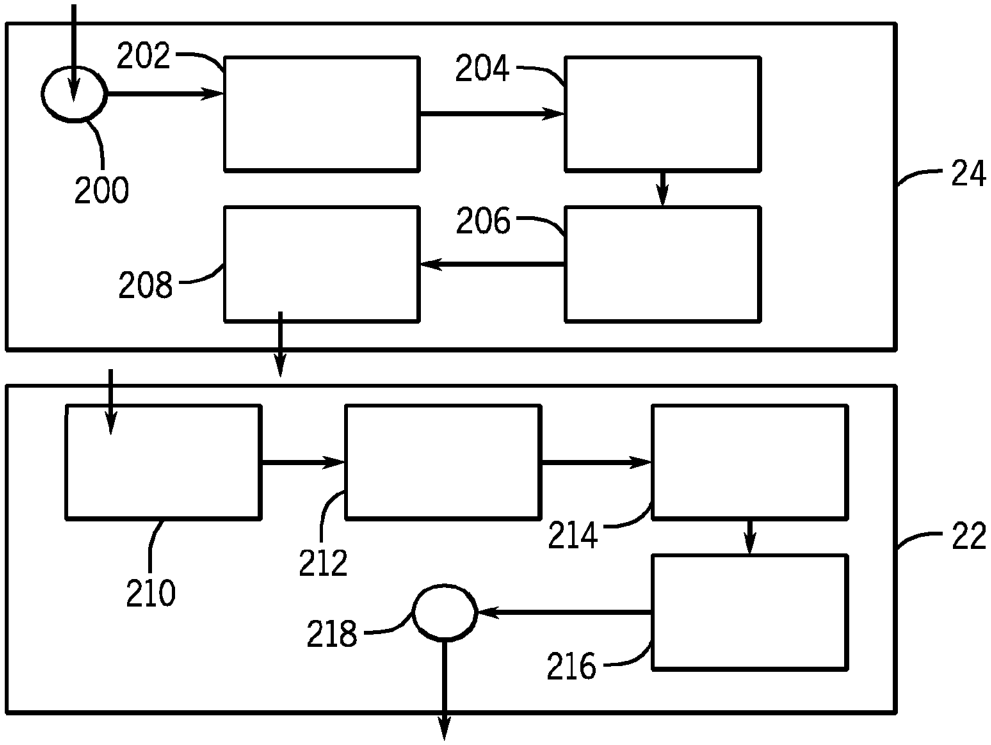
FIG. 11 is a flow chart showing one example of a parent unit with automatic channel scanning capability and constructed in accordance with the teachings of the present invention.

In another aspect of the present invention, a wireless baby monitor 20 is depicted generally in FIG. 11 that can use spread-spectrum digital communication. The system can allow for true privacy, automatic channel section, and transmission of commands or data other than audio information, without use of or need for additional hardware. The general or basic system shown in FIG. 11 includes a parent unit 22 and a child unit 24, each incorporating wireless RF technology.

The child unit 24 in this example has a transducer or microphone 200 that picks up sound and transmits the analog information to a microphone amplifier 202. The amplifier 202 sends an amplified analog audio signal to an analog-to-digital converter or ADC 204 which converts the analog audio to a digital signal. The ADC sends the digital information to a microprocessor 206 in the child unit that converts the digital information into a wireless digital data stream and delivers the data stream to a RF transmitter 208.

The parent unit 22 in this example includes a RF receiver 210 that receives the signal transmitted by the child unit 24 and sends the digital data stream to a microprocessor 212 in the parent unit. The microprocessor 212 in this example processes the data stream and sends the digital data to a digital-to-analog converter or DAC. The DAC 214 converts the digital information to an analog voltage and delivers the analog signal to an amplifier 216, which in turns delivers the amplified analog information to a transducer or speaker 218 in the parent unit. This digital wireless baby monitor system can be configured in many different ways to enhance the performance and functionality of the system. The microprocessors can also be configured to achieve a variety of enhanced system functions.

Privacy in baby monitor systems is a known problem. Analog baby monitors typically use frequency modulation or FM to transmit audio. FM transmissions are easily decoded by any FM receiver that happens to be tuned to the proper frequency. A wireless digital audio system has inherent privacy not present in a conventional frequency modulation system. A wireless digital system requires the correct hardware and software in order to decode RF digital data transmitted over the system. It is unlikely that another manufacturer's digital audio system would decode the data transmitted by one system properly. However, the possibility still exists that a user with the same model baby monitor system could possibly listen into another's transmission.

Privacy can be built into a wireless system generally in FIG. 11. In one example represented in FIG. 12A, a private or unique identification code (ID) can be stored in the child unit 24. This unique ID is then used as a key or a seed to encrypt the digital audio data (DATA) prior to it being transmitted from a RF transmitter 208 of the child unit. The encryption can be done in many ways. In one example, a binary logic operation, such as "Exclusive OR" or "XOR," can be used to encrypt the child unit data without actually transmitting the ID with the transmission. The same unique ID is also stored in the parent unit 22 and must be the same ID as the child unit. The parent unit 22 will decrypt the data and determine if the data is valid. If not valid, the parent unit will look for other data. If the data is valid, the parent unit can then reproduce the audio. If the ID stored in the parent unit does not match that used to encrypt a digital data stream, the decrypted data will be invalid and rejected by the parent unit.

Figure 12A:
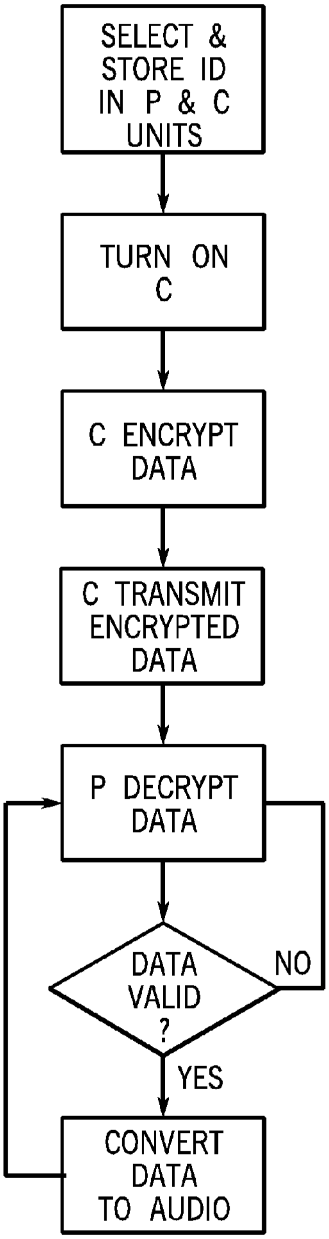
FIGS. 12A-12C are flow charts showing examples of baby monitor systems that employ privacy features in accordance with the teachings of the present invention.

Again, the above example is represented by the FIG. 12A flow chart. A 16 bit ID can be stored in the child unit (C) and the parent unit (P). A unique 16 bit ID mathematically creates 65,536 possible different codes. The possibility that two different monitor systems, whether from the same or different manufactures, will have the same ID and will be in such close proximity that they can pick up each others' signals is about 0.0015%. Thus, simply by storing a unique ID in both the child unit and the parent unit and using the ID information to encrypt date, one can significantly enhance privacy of transmission between child and parent units in different systems, even if from the same manufacturer.

Figure 12B:
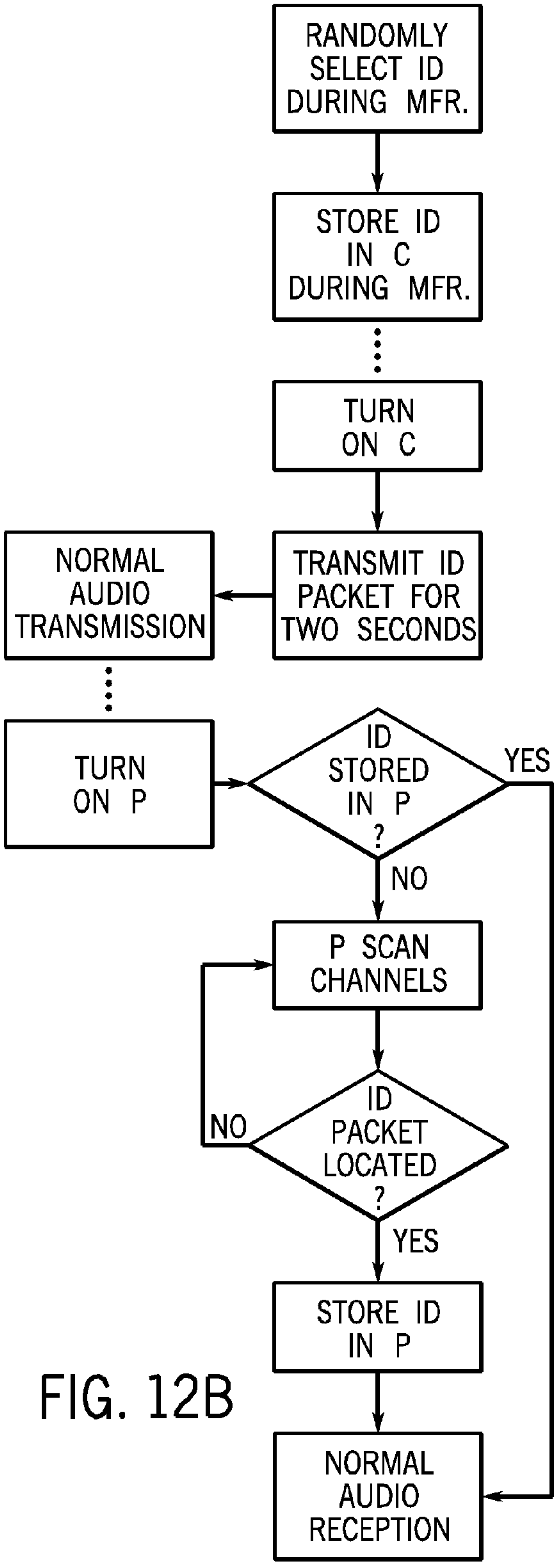

In one example represented in FIG. 12B, a 16 bit ID code stored in the child unit (C) can be randomly selected at the time of manufacture. Each time the child unit is turned on, the unit can be configured to transmit a special packet (ID packet) of data that contains the unencrypted 16 bit ID. The parent unit can be configured so that it does not have a stored 16 bit ID when it is manufactured. When the parent unit is first powered up in this state, it can be configured to continuously scan all available channels until it finds the special ID packet from the child unit. When this packet is detected by the parent unit, the parent unit can then store the located ID permanently. The parent and child units will from then on operate in normal transmission and reception modes. The parent unit can also be configured so that it does not respond to any special ID packets once it has detected the packet from the child unit and stored the ID.

In one example, the parent unit 22 can be made to forget the 16 bit ID through a specifically programmed or configured start-up key pressing sequence. This can allow a user to pair a parent unit with a different child unit if and when necessary instead of having to discard the parent unit if the child unit no longer functions. The parent unit in this example will thus recognize only data transmissions from a child unit with the unencrypted 16 bit ID that is first recognized or that is first recognized after being re-programmed or re-sequenced. In these examples, the child unit and parent unit are paired so as to function only with one another by recognition of a unique 16 bit ID code. ID codes can vary and yet fall within the spirit and scope of the present invention and need not be only 16 bit codes. The codes can be less complex, more complex, or involve different data packets or other information. Additionally, the encryption methods and formulas can also vary considerably and yet fall within the spirit and scope of the present invention.

Figure 12C:
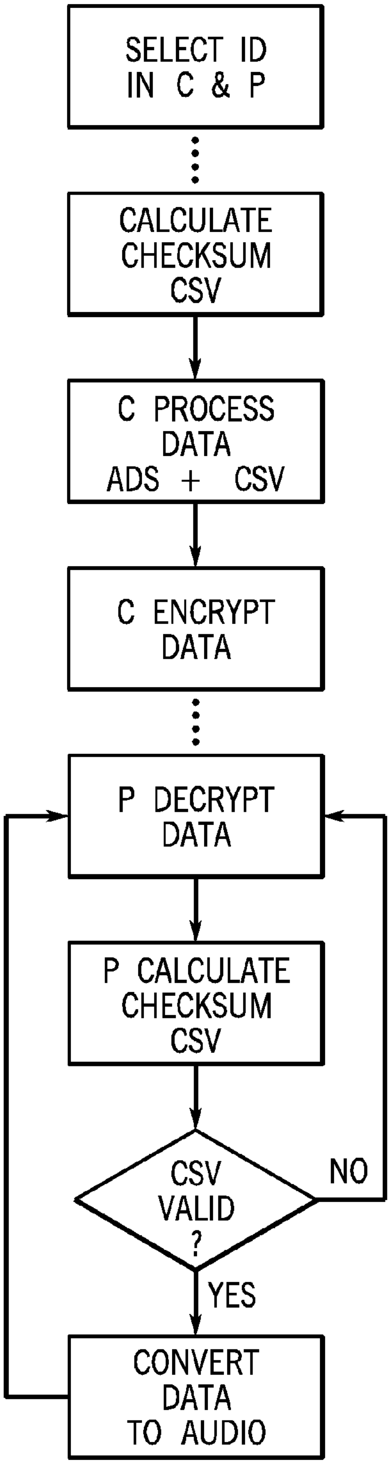

In another example represented in FIG. 12C, each digital audio data packet (DATA) transmitted by the child unit (C) can contain an audio data sample (ADS) and a checksum value (CSV), which is calculated by adding bits of the audio data sample. In one example, the child unit transmission can include a 16 bit audio data sample and an 8 bit checksum value calculated by adding the first 8 bits and last 8 bits of the audio data sample. Before the data is transmitted by the child unit, the audio data can again be encrypted with the unique ID code of the child unit. In one example, a 16 bit audio data sample can be encrypted using a binary logic function, such as the "Exclusive OR" operation mentioned above, with a 16 bit unique ID code of the child unit.

This can provide a rudimentary form of data encryption that can be easily and quickly implemented in a low-cost microcontroller and that can take virtually no time to occur in the baby monitor system 20 as it functions. It is, however, also possible to use a more robust or complicated encryption and decryption method. In one example, the method can include the unique ID code as a seed for a more complex encryption technique, but may require additional processing power or dedicated hardware to accomplish.

The parent unit 22 also has the same stored unique ID code as the child unit. In this example, the parent unit receives the data packet transmitted by the child unit 24, which includes the encrypted 16 bit audio data sample. The parent unit decrypts the data sample with the unique ID code now stored in the parent unit. This process decrypts and restores the original audio data sample. An 8 bit checksum can then be calculated from the 16 bit audio data and compared to the 8 bit checksum received from the child unit. If the 8 bit checksums match, then the data is valid and the parent unit will not reject the data. The parent unit thus will restore the original 16 bit sample Successful completion of this decryption will imply to the parent unit 22 that the unique ID code stored in the child unit 24 and parent unit match. However, there will have been no direct comparison between the two unique ID codes ever performed by the parent unit. This enhances privacy significantly between this particular system and other systems, even those of the same manufacturer. Also, there will have been no direct transmission of the actual ID code from the child unit to the parent unit.

Privacy of the RF transmission can be achieved in other ways as well. In one example, an ID code can be added to the information packet structure of every packet, or only occasional packets, without actually changing the rest of the packet. The parent unit can check the ID code in the packet to be sure it is the correct recipient of the information.

In another example, a frequency hopping modulation system can be employed that uses a pseudo-random number (PRN) generator to determine the next frequency to hop. A unique ID code can be used as a seed for the PRN. The parent unit must also have the same unique ID code to seed its PRN in order to match the frequency hopping sequence of the child unit. If the ID codes don't match, the parent unit will always hop to a different frequency and then the received data would be considered invalid or garbage by the parent unit. In such a system, it would not be necessary to encrypt the data before it is transmitted. Instead, the modulation method automatically adds a level of encryption, as the parent and child units must follow the same frequency hopping sequence.

The earlier examples described above used direct-sequence modulation, but in a relatively simple form. In another more complex example, a PRN can be transmitted that runs at a higher frequency than the data being transmitted. The PRN would be considered as a chipping code. The chipping code can then be cross referenced with the data to be transmitted by the child unit. The unique ID code of the child unit can be used as a seed for the PRN in this example as well. The parent unit or receiver must also have the same unique ID code as a seed for its PRN in order to cross reference with the incoming data. If the ID codes don't match, the parent unit will always receive invalid or garbage data. In such a system, it is also not necessary encrypt the data before it is transmitted. The modulation created by implementing the PRN adds a layer or level of encryption.

There are few existing baby monitor systems that include automatic channel selection in the parent unit. The few systems that do automatically select or locate a channel do so simply by searching for a received RF signal above a certain strength or threshold level. This method is well known as Received Signal Strength Indication (RSSI) and simply results in the parent unit locking onto a strong signal. An RSSI baby monitor system can easily be fooled by a signal from any RF transmitter emitting a nearby strong signal. Also, the RSSI level does not provide any information to the parent unit or the system about the quality of the RF signal received.

Figure 13:
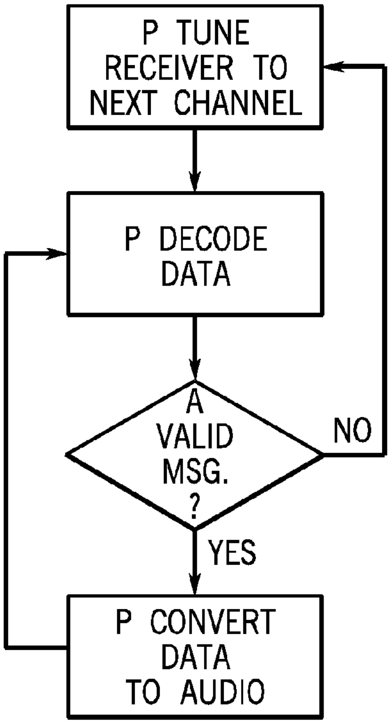
FIGS. 13 and 14 are flow charts showing examples of a baby monitor system with channel scanning features in accordance with the teachings of the present invention.

In another aspect of the present invention shown in the flow chart of FIG. 13, a RF receiver in the parent unit 22, such as that depicted generally in FIG. 11, can automatically scan and test each available channel. Each channel can be tested to determine if a signal can be decoded to produce valid data. This method does not require checking the RSSI level. Instead, the parent unit microprocessor can be configured to tune the RF receiver to one particular channel at a time and then test the data on that channel.

In one example, the parent unit is configured to then attempt to decode the received data. If no good data can be decoded, the RF receiver is tuned to the next possible channel and again attempts to decode the received data. This tuning or channel scanning procedure is continued until good data appears to be received in this example. If valid data is decoded, the parent unit can be configured in one example to then decode and convert the digital information.

Figure 14:
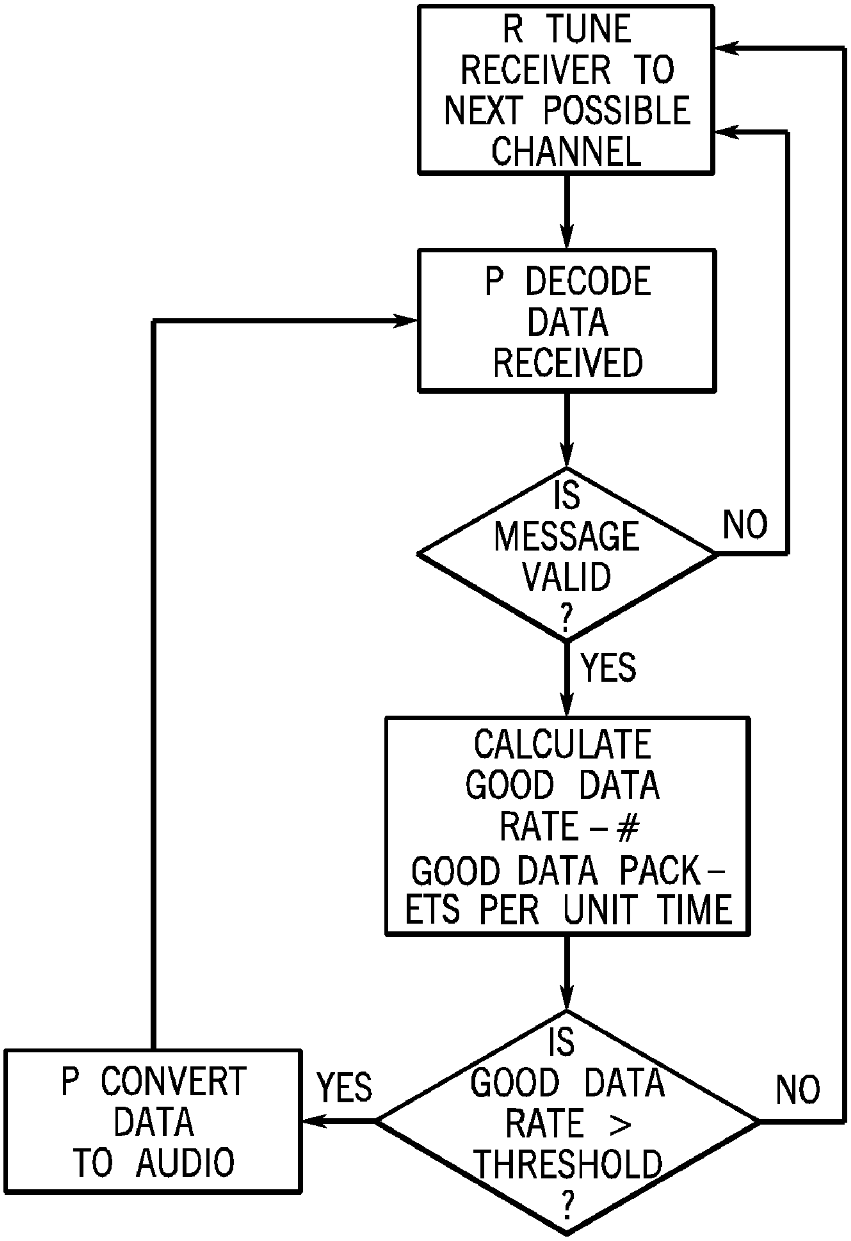

In another example as depicted in FIG. 14, two additional steps can be added to enhance privacy and/or security. In this example, once valid data is detected, the parent unit microprocessor can be configured to then calculate a good data rate in the form of a number of good data packets per unit of time. This good data rate is then compared to a threshold good data reference. If the calculated good data rate falls below the threshold reference, the RF receiver is again tuned to the next possible channel. If the good data rate is greater than the threshold reference rate, the parent unit can be configured to then convert and transmit the incoming data.

The automatic channel selection feature examples disclosed herein can be further enhanced if desired. In one example, a parent unit 22 can be configured so that either the connection indicator light 64, an emitted sound such as a beep, or both alert the user that there is a good wireless connection to the child unit. If the connection light 64 is used, a green illumination can indicate a good connection and a red illumination can indicate a bad or no connection. If desired, the parent unit microprocessor can be configured to continuously or periodically monitor the good data rate or number of good data packets received per unit time. Parents often carry the parent unit with them as they move about their house or yard. They may wish to know if they are receiving a good connection at a given moment. If the good data rate falls below the threshold reference rate at any time, the connection is considered bad and the red connection light can be illuminated and/or a sound can be emitted.

In an alternative example, the parent unit can be configured to check or determine a data error rate or number of bad data packets received per unit time. In such an example, if the bad data rate were to go above a bad data threshold, the connection would be considered good. In another example, the parent unit can be configured to look for some other part of a data packet, such as a packet header, to determine if a good connection is present on a given channel.

The automatic channel scanning feature can be configured to take very little real time. In one example, the parent unit can be configured to operate in a fast scanning mode. In this example, if the good data rate is very low on various channels, the parent unit will then scan each channel very quickly, until detecting a high or higher good data rate. The time spent checking or decoding data on each channel can be only about 50 milliseconds. Once a channel is located and selected with a high or sufficiently high good data rate, the parent unit can be configured to operate in a channel tweak mode. In this mode, the unit will check, in one example, one channel higher and one channel lower to determine if the good date rate falls in comparison to the selected channel. The channel with the highest good data rate will then be selected. When the parent unit has found and selected the correct channel, the unit can operate in a normal mode. In one example, the parent unit can verify a good data rate periodically to prevent the unit from changing channels as a result of a minor, momentary signal glitch. The parent unit can monitor the good data rate every two seconds, for example. Using a good connection light indicator such as the light 64 of the unit 22 in FIG. 1, the connection light is illuminated green when in this normal or "connected" mode.

In another aspect of the invention, the parent unit microprocessor, analog-to-digital converter or ADC, speaker amplifier, and speaker are capable together of generating high quality sounds. The microprocessor can be configured to alert a user of various operational conditions with various sound emitted from the parent unit speaker. Previous baby monitor systems typically generate digital square waves by toggling a microprocessor output pin. The pin is typically connected to the audio amplifier circuit of a unit. While this is inexpensive, the sound quality is typically quite poor and the sound options limited. Using the configuration such as that disclosed in FIG. 11 for example, the parent unit can generate high quality sounds of optional character. In one example, different sounds can be used to alert a user of different conditions.

A typical RE transmitter, and not just those limited to the few known digital baby monitor systems, is designed to include a phase-locked loop (PLL). A PLL is configured to lock precisely on a desired transmit frequency. Thus, if the above-disclosed automatic channel scanning feature were implemented using a conventional RE transmitter with a PLL, the parent unit would lock onto the one located channel with the high data rate. The unit then would not operate in the normal mode described above and would not periodically check the channel connection. Thus, the disclosed automatic channel scanning feature used in a monitor system need not employ a PLL. However, without a PLL, a voltage-controlled oscillator or VCO that generates a 900 MHz carrier signal, for example, may be susceptible to substantial frequency drift with changes in ambient temperature. This can be addressed in the disclosed system by adding a temperature-compensating capacitor to the VCO circuit without employing a PLL.

In order to further tolerate potential frequency drift by the VCO, the parent unit in one example can be configured to scan a large number of channels using 512 kHz spacing between channels. Since a transmission bandwidth may typically be about 700 kHz in a 900 MHz digital baby monitor system, the disclosed spacing can guarantee that the parent unit will find a channel with a low data error rate or a high good data rate, even if the child unit transmit frequency has drifted from the original frequency detected by the parent unit.

Converting analog audio information into a digital data stream and then re-converting the digital data stream into an analog audio signal typically requires very precise and synchronized data clocks at both the transmitter and receiver. This has typically been done by transmitting the actual clock signal in parallel with the data or by embedding the clock signal in the data stream and extracting the clock signal at the receiver. The latter is known as clock recovery. The Sony/Philips Digital Interface (S/PDIF) is an example of a known system configuration that embeds the clock in the digital data stream. The S/PDIF is typically used as a consumer-grade digital output for CD players. The Sony Digital Interface Format (SDIF-2) is an example of a known system configuration that transmits the clock signal separately from the digital data stream for clock recovery at the receiver. The SDIF-2 is typically used to connect professional digital audio equipment. Both of these system configurations require extra hardware to handle the transmitted clock.

In another aspect of the disclosed invention, a child unit 24 need not transmit the clock signal either separately with the transmitted data or encoded within the digital data stream. Without the clock signal, the parent unit may likely process audio data samples received from the child unit at a rate slightly higher or slightly lower than the rate at which data is transmitted by the child unit. To minimize the frequency difference between the two units without transmitting the clock signal, timing elements can be employed in both units for the ADC and the DAC. In one example, crystal clocks can be used in both the parent unit and child unit as timing elements for the ADC and DAC. The parent unit can also employ a first-in first-out (FIFO) data buffer to accommodate the asynchronous arrival of data and consumption by the DAC.

Over time, a frequency difference between the clocks in the parent unit and child unit will result. For example, the parent unit may ultimately have one more data sample than it can process, or one missing data sample that it can not process. If the parent unit has one extra data sample, the parent unit can be configured to simply discard the sample. If the parent unit has a missing data sample, the parent unit can be configured to repeat the previous data sample. Either of these processes can result in a very minor glitch in the output voltage waveform. However, such a minor glitch will be difficult if not impossible to detect with the typical audio quality that is transmitted over a baby monitor system. In one example, such a glitch will happen once every few seconds with 50 ppm crystal clocks in the units.

In an alternative example, the parent unit can be configured to monitor the full or empty status of a FIFO buffer that is used to store decoded data in the parent unit. The unit can be configured to adjust the data clock slightly faster or slower accordingly. In such an example, if the FIFO buffer is approaching empty, the parent unit data clock is too fast and can be adjusted slower. If the FIFO buffer is approaching full, the parent unit data clock is too slow and can be adjusted faster.

In another aspect of the invention, the disclosed baby monitor system can be enhanced so that more than just audio information is transmitted from the child unit to the parent unit. If the disclosed baby monitor examples are set up to operate as a typical monitor system, the child unit would primarily transmit data packets that contain audio information. However, using unit configurations as disclosed for example in FIG. 11, the system can be upgraded to transmit commands and data other than audio information, and can do so in both directions between the units.

Figure 15:
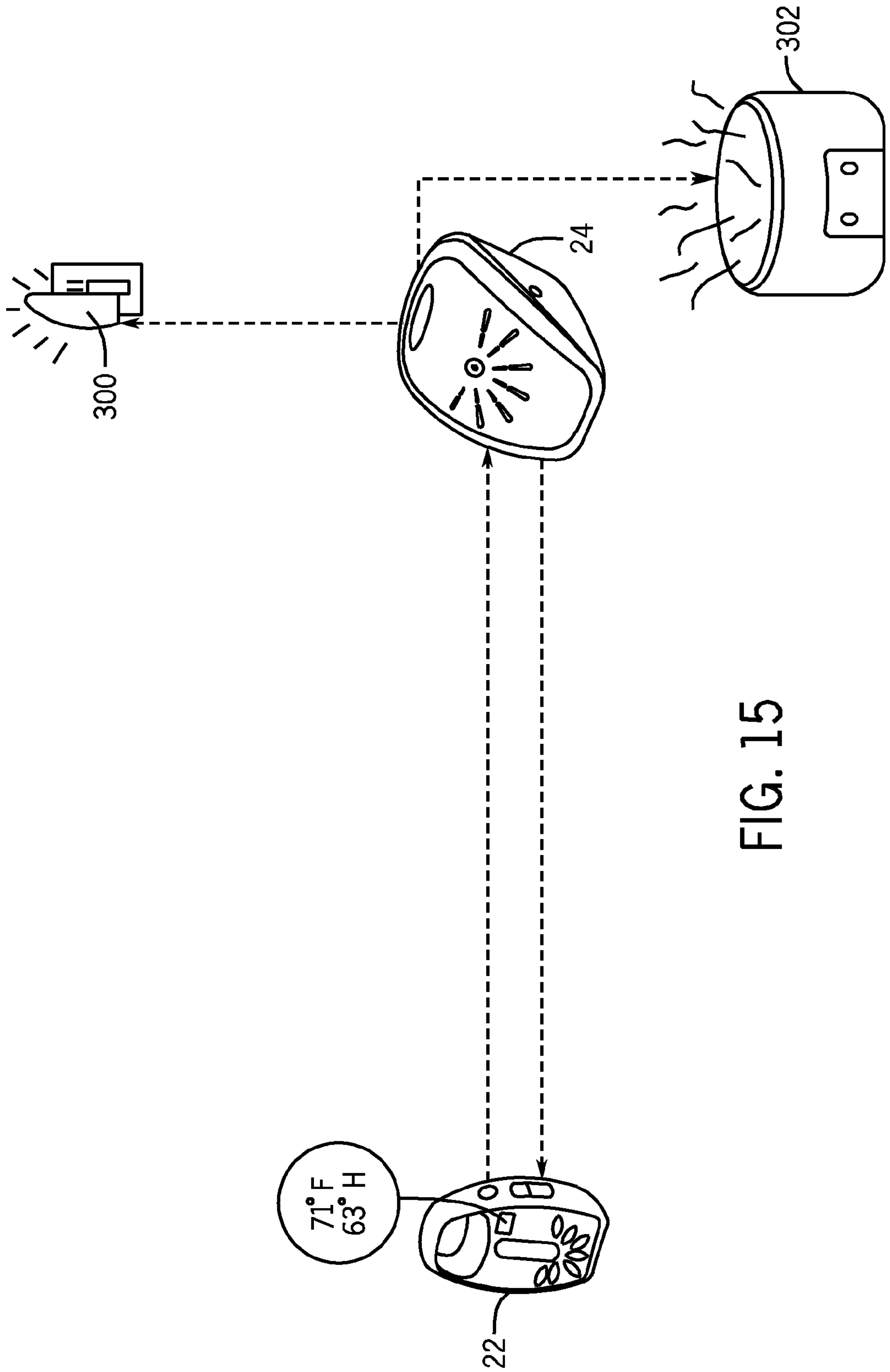
FIG. 15 is a schematic representation of another example of a baby monitor system constructed in accordance with the teachings of the present invention and that is capable of two-way non-audio transmission between units of the system.

In one example shown schematically in FIG. 15, the microprocessor in the parent unit 22 can transmit a command to turn on or off a nightlight 300 that is in or near the child unit 24. In another example, the child unit can detect and transmit temperature and/or humidity data from the environment around the child unit to the parent unit. In yet another example, the parent unit can transmit a command to a humidifier 302 or other device in the child's room to turn the device on or off, or to alter one or more of the devices operating parameters.

One example of a two-way, or even a three-way, communication system would combine all of the elements of the parent unit and child unit or units presented previously, for example, in FIG. 11. Each unit would have a transmitter and a receiver and the appropriate hardware. Each unit thus would have transmission and receiving capability. In one example, each unit can then transmit on the same channel by using a time-division multiplexing scheme. In such a scheme, a transmitter first can determine if another unit is transmitting data. Once the unit determines that no other unit is transmitting, i.e., that the channel is clear, the unit will transmit. In another example, each unit could be configured to transmit on a different channel.

The previous examples of child units disclosed herein do not have components necessary to automatically select a transmission channel. A more advanced automatic channel selection example can have the child unit first locate a clear channel and then transmit a data packet. The parent unit in this example can then automatically scan for the transmission and send an acknowledgement back to the child unit when the transmission is received and verified.

In another example, the microcontrollers or microprocessors of the units can be used to perform data packet encoding and data packet decoding. However, encoding and decoding can alternatively be performed using other types of hardware. In one example, an Application Specific Integrated Circuit (ASIC), a Field Programmable Gate Array (FPGA), or a Digital Signal Processor (DSP) could be employed in the units to perform this function. It is also possible to include many of the other functional blocks or features of the units described previously, including the ADC, DAC, microphone amplifier, speaker amplifier, RF transmitter and RF receiver, into the non-audio communication functions.

Although certain monitor system and feature examples have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A baby monitor system comprising:

a child unit having a child transducer that receives and converts incoming audio signals to an incoming analog signal, an analog-to-digital converter that converts the incoming analog signal to a digital representation of the incoming audio signals, a child microprocessor that generates a data stream from the digital representation, and a transmitter that transmits a wireless signal representative of the data stream on a selected channel of a plurality of channels; and a parent unit having a receiver that receives the wireless signal and converts the wireless signal to incoming digital data, a parent microprocessor that processes the incoming digital data, a digital-to-analog converter that converts the processed incoming digital data to outgoing analog information, and a parent transducer that converts the outgoing analog information into outgoing audio signals representative of the incoming audio signals;

wherein the parent microprocessor is configured to tune the receiver in accordance with a channel selection scan for the selected channel, the channel selection scan comprising an attempt by the parent microprocessor to detect valid data on a particular channel of the plurality of channels using an identification code stored on both the child unit and the parent unit but not included in the data stream.

2. A baby monitor system according to claim 1, further comprising:

a child amplifier in the child unit that amplifies the incoming analog signal and sends an amplified incoming analog signal to the analog-to-digital converter.

3. A baby monitor system according to claim 1, further comprising:

a parent amplifier in the parent unit that amplifies the outgoing analog information and sends amplified outgoing analog information to the parent transducer.

4. A baby monitor system according to claim 1, wherein the attempt by the parent microprocessor decodes any data on each channel to determine whether the data is the wireless signal.

5. A baby monitor system according to claim 4, wherein the receiver automatically scans the plurality of channels.

6. A baby monitor system according to claim 4, wherein the parent unit determines whether the data is the wireless signal by measuring a good data rate on each channel until locating a good channel of the plurality of channels where the good data rate is above a minimum threshold good data rate.

7. A baby monitor system according to claim 6, wherein the parent unit automatically verifies a good connection by periodically re-measuring the good data rate on the good channel.

8. A baby monitor system according to claim 6, wherein the parent unit first operates in a fast scan mode until locating the good channel.

9. A baby monitor system according to claim 8, wherein the parent unit operates in a channel tweak mode upon locating the good channel by checking the good data rate of a next lower frequency channel and a next higher frequency channel relative to the good channel.

10. A baby monitor system according to claim 9, wherein the parent unit operates in a normal operation mode upon determining that the good channel has a higher good data rate than the next lower and next higher frequency channels.

11. A baby monitor system according to claim 7, wherein the parent transducer emits a good connection signal as long as the parent unit detects the good data rate on the good channel.

12. A baby monitor system according to claim 4, wherein the child microprocessor determines which channel of the plurality of channels over which to transmit the wireless signal.

13. A baby monitor system according to claim 1, wherein the child microprocessor determines the selected channel of the plurality of channels for transmission of the data stream.

14. A baby monitor system according to claim 1, wherein the child unit comprises a user push button to cause the child microprocessor to select a different channel of the plurality of channels.

15. A baby monitor system according to claim 1, wherein the child microprocessor uses the identification code as a key for encryption of the digital representation of the incoming audio signals, and wherein the parent microprocessor uses the identification code for decryption of the incoming digital data.

16. A baby monitor system according to claim 15, wherein the encryption uses a binary logic operation on the digital representation and the identification code.

17. A baby monitor system according to claim 15, wherein the attempt by the parent microprocessor includes a checksum calculation after the decryption.

18. A baby monitor system according to claim 1, wherein the child and parent microprocessors use the identification code as a seed for respective pseudorandom number generators to determine a frequency hopping sequence for the wireless signal.

19. A baby monitor system according to claim 1, wherein the child and parent units are paired via storage of the identification code in the parent unit after a startup sequence in which the parent unit scans all available channels to find an identification code packet transmitted by the child unit.

20. A baby monitor system comprising:

a child unit having a child transducer that receives and converts incoming audio signals to an incoming analog signal, an analog-to-digital converter that converts the incoming analog signal to a digital representation of the incoming audio signals, a child microprocessor that generates a data stream from the digital representation, and a transmitter that transmits a wireless signal representative of the data stream on a selected channel of a plurality of channels; and a parent unit having a receiver that receives the wireless signal and converts the wireless signal to incoming digital data, a parent microprocessor that processes the incoming digital data, a digital-to-analog converter that converts the processed incoming digital data to outgoing analog information, and a parent transducer that converts the outgoing analog information into outgoing audio signals representative of the incoming audio signals;

wherein the parent microprocessor is configured to tune the receiver in accordance with a channel selection scan for the selected channel, the channel selection scan comprising an attempt by the parent microprocessor to detect valid data on a particular channel of the plurality of channels wherein the parent unit determines whether the data is the wireless signal by measuring a good data rate on each channel until locating a good channel of the plurality of channels where the good data rate is above a minimum threshold good data rate, wherein the parent unit automatically verifies a good connection by periodically re-measuring the good data rate on the good channel, and wherein the parent transducer emits a good connection signal as long as the parent unit detects the good data rate on the good channel.

* * * * *